(12) United States Patent
Trede et al.

(10) Patent No.: US 7,537,247 B2
(45) Date of Patent: May 26, 2009

(54) LOCKING PART FOR A RAPID COUPLING

(75) Inventors: Michael Trede, Habsheim (FR); Jean-Martin Henlin, Waldighoffen (FR); Axel Feger, Lorrach (DE)

(73) Assignee: A. Raymond Et Cie, Grenoble (FR)

( * ) Notice: Subject to any disclaimer, the term of this patent is extended or adjusted under 35 U.S.C. 154(b) by 65 days.

(21) Appl. No.: 11/718,913

(22) PCT Filed: Oct. 20, 2005

(86) PCT No.: PCT/EP2005/011261

§ 371 (c)(1),
(2), (4) Date: May 9, 2007

(87) PCT Pub. No.: WO2006/053620

PCT Pub. Date: May 26, 2006

(65) Prior Publication Data

US 2008/0111372 A1    May 15, 2008

(30) Foreign Application Priority Data

Nov. 11, 2004  (DE) .................. 10 2004 054 467

(51) Int. Cl.
*F16L 37/00* (2006.01)
(52) U.S. Cl. .................. 285/305; 285/308
(58) Field of Classification Search ........... 285/305, 285/308
See application file for complete search history.

(56) References Cited

U.S. PATENT DOCUMENTS

| | | | |
|---|---|---|---|
| 6,059,324 A | 5/2000 | Fricker et al. | |
| 6,155,612 A * | 12/2000 | Szabo | 285/319 |
| 6,231,089 B1 * | 5/2001 | DeCler et al. | 285/308 |
| 6,318,764 B1 * | 11/2001 | Trede et al. | 285/305 |
| 6,371,529 B1 * | 4/2002 | Szabo et al. | 285/319 |
| 6,612,622 B2 * | 9/2003 | Andre et al. | 285/305 |
| 6,905,143 B2 * | 6/2005 | Klinger et al. | 285/140.1 |
| 7,029,036 B2 * | 4/2006 | Andre | 285/319 |
| 2001/0048225 A1 * | 12/2001 | Andre et al. | 285/305 |
| 2003/0137148 A1 * | 7/2003 | Andre et al. | 285/305 |
| 2003/0178844 A1 | 9/2003 | Klinger et al. | |
| 2007/0040377 A1 | 2/2007 | Moretti et al. | |

FOREIGN PATENT DOCUMENTS

| | | |
|---|---|---|
| DE | 10115399 C1 | 6/2002 |
| DE | 19737704 C2 | 10/2002 |

\* cited by examiner

*Primary Examiner*—David E Bochna
(74) *Attorney, Agent, or Firm*—Baker & Daniels LLP

(57) ABSTRACT

A locking element for a quick connector is provided with a matable element releasably connectable to a receiving element of the quick connector. An actuating element is in engagement with the matable element and is mounted within the matable element such that it is displaceable between a released position and a locked position. The actuating element includes a locking device that can be brought into engagement with a retaining ring on an insertable element of the quick connector in an arrangement wherein the locking device is mated with the receiving element in the locked position. Secure attachment of the locking element to the quick connector and ease of use are thereby achieved.

3 Claims, 3 Drawing Sheets

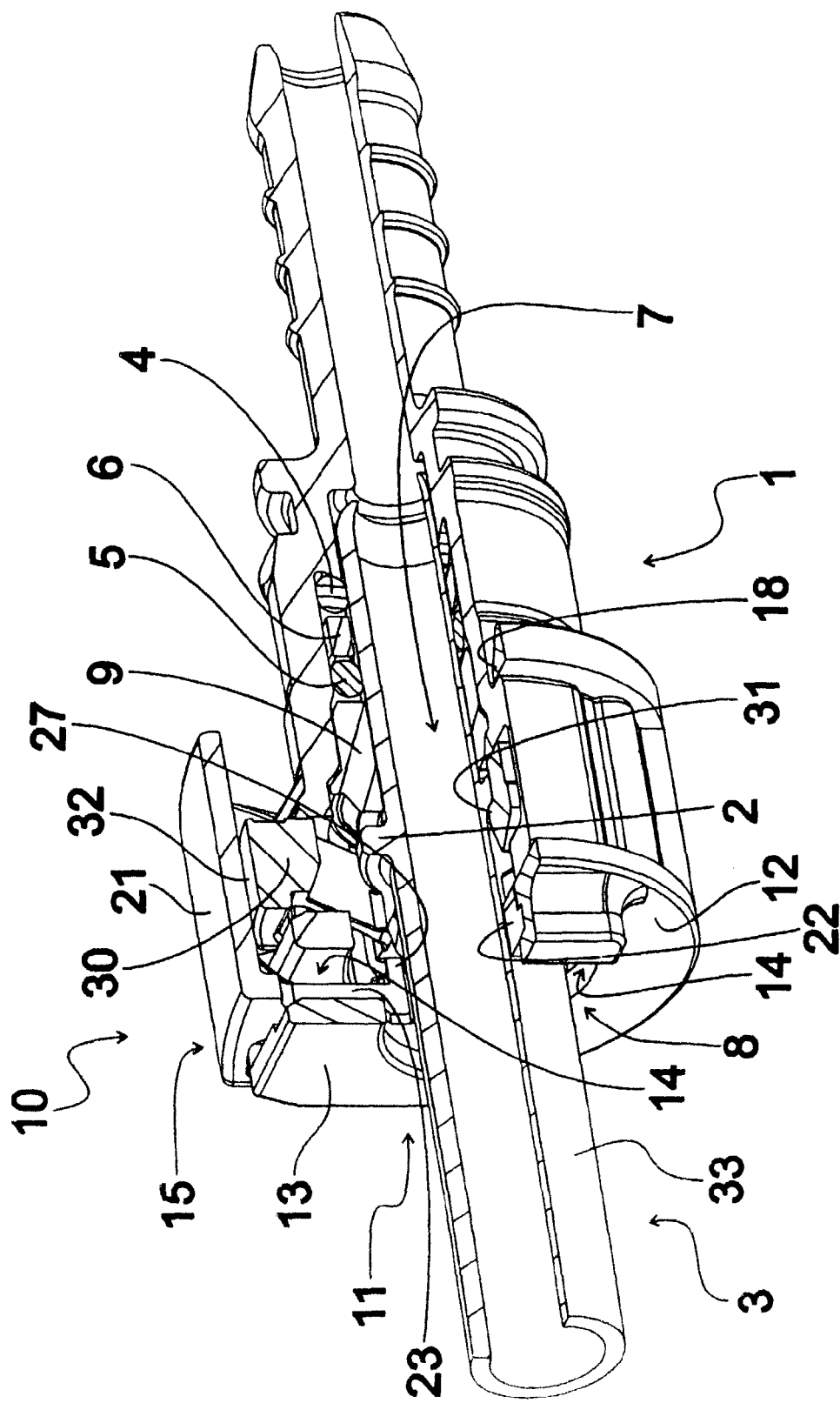

LOCKING PART FOR A RAPID COUPLING

BACKGROUND OF THE INVENTION

1. Field of the Invention

The invention relates to a locking element for a quick connector.

2. Description of the Related Art

A locking element is known for example from US 2003/0137148 A1. The prior one-piece, U-like locking element is provided with means for effecting a snap connection with a receiving element of a quick connector, and with locking means which in a locked position can be brought into engagement with a retaining ring configured on an insertable element of the quick connector. The means for effecting a snap connection are configured as radially outwardly projecting noses formed onto outer arms oriented parallel to each other. The locking means are configured in the form of two mutually opposite projections disposed inwardly of the outer arms. The prior locking element is displaceably mounted in a clearance configured in the receiving element of the quick connector.

A further one-piece locking element for a quick connector is known from DE 101 15 399. This one-piece locking element can be mated onto a quick connector and is provided with means for effecting a snap connection with a receiving element of a quick connector, the locking element being displaceable perpendicularly to the longitudinal direction of the quick connector between a locked position that protects an insertable element of the quick connector against accidentally slipping out and a released position in which the insertable element can be withdrawn from the receiving element.

SUMMARY OF THE INVENTION

The present invention provides a locking element for a quick connector which, as a supplemental, particularly also retrofittable, locking element is distinguished by secure attachment to a receiving element of the quick connector and by ease of use.

By virtue of the fact that the inventive locking element is configured as two-part, with a matable element and an actuating element, the matable element, due to the specific configuration, being able, as an additional component besides a U-type or ring-shaped locking element already present on the quick connector, reliably to be brought into engagement forwardly with the receiving element of the quick connector, taken in the direction of insertion of the insertable element, and the actuating element being mounted in the matable element and thus independently of the configuration of the receiving element of the quick connector, operationally reliable fixation and ease of use of the additional lock are obtained.

The provision of a cover plate provides an actuating surface configured on a quick connector and serving to release an insertable element, thereby substantially reducing the risk of accidental loosening in the connection made by the quick connector.

In one form thereof, the present invention provides a locking element for a quick connector, including means for effecting a snap connection (18, 19) with a receiving element (1) of a quick connector and comprising locking means (22, 23, 25, 26) which in a locked position can be brought into engagement with a retaining ring (2) configured on an insertable element (3) of said quick connector, characterized in that present as a separate component is a matable element (11) on which said means for effecting a snap connection (18, 19) are configured and which comprises, disposed opposite said means for effecting a snap connection (18, 19), a bearing wall (12) which in an arrangement of being mated onto said receiving element (1) bears against the front side of said receiving element (1), taken in the direction of insertion of said insertable element (3), and in that present as an additional separate component is an actuating element (15) that is in engagement with said matable element (11) and is mounted in said matable element (11) so as to be displaceable between a released position and a locked position and is equipped with said locking means (22, 23, 25, 26).

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a partial cut-away perspective view of the exemplary embodiment according to FIG. 1 mated onto a quick connector in a locked position.

Figure 1:
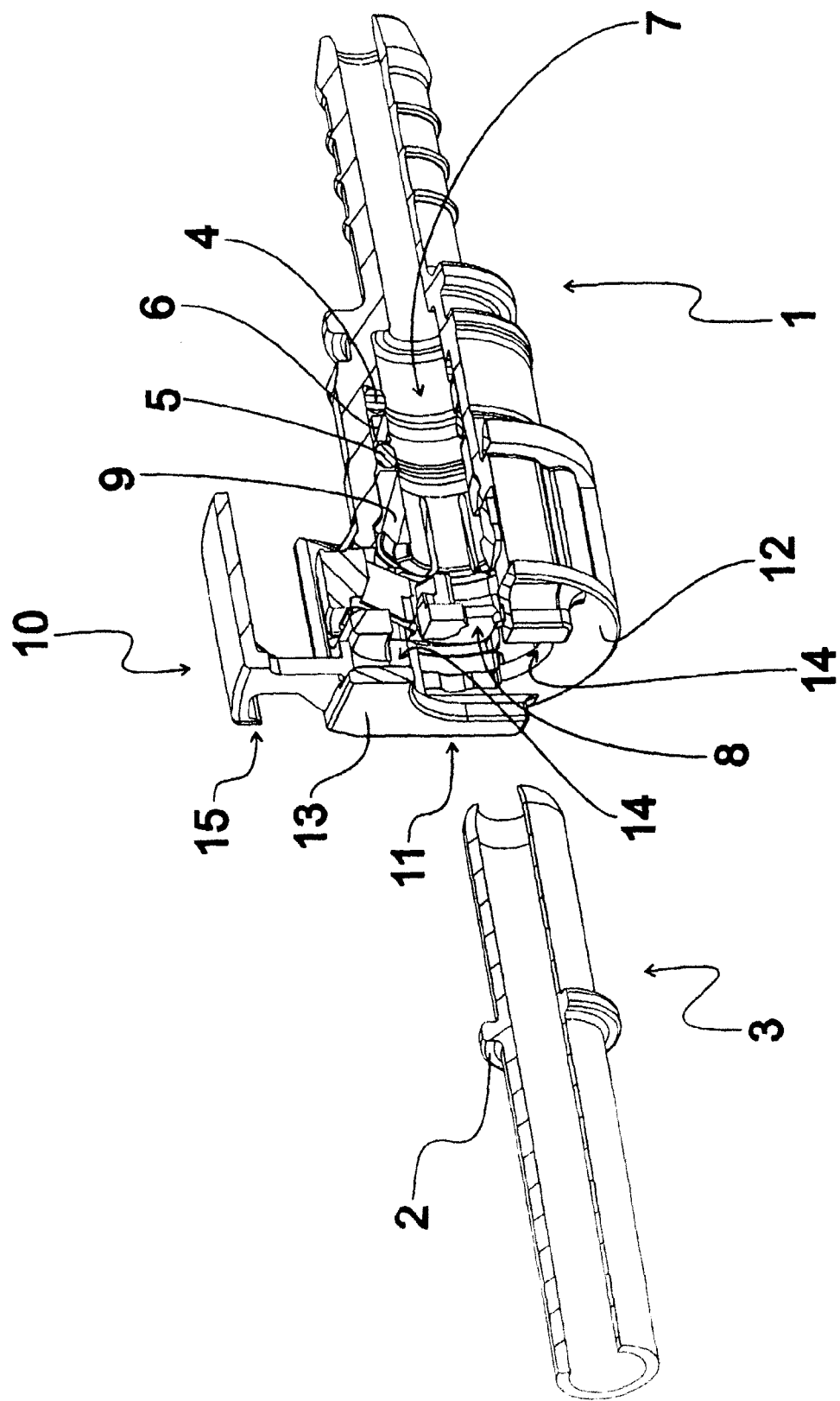
FIG. 1 is a partially cut-away perspective view of an exemplary embodiment of an inventive locking element mated onto a quick connector in a released position.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a partially cut-away perspective view of an elongated, cylindrically configured receiving element 1 of a quick connector, which element can be connected to an end (not shown in FIG. 1) of a conduit of a fluid carrying system. To sealingly connect the receiving element 1 to an insertable element 3 that is part of the quick connector and is configured as a retaining ring 2, a first sealing ring 4, a second sealing ring 5 and an intermediate sealing ring 6 disposed between said sealing rings 4, 5 are present in a receiving space 7 of the receiving element 1. A spacing ring 9 disposed adjacent the side of second sealing ring 5 facing the insertion side 8 serves to hold sealing rings 4, 5 and intermediate ring 6 in place on the side of receiving space 7 facing away from insertion side 8.

Also illustrated in FIG. 1 is an exemplary embodiment of an inventive locking element 10 in an arrangement wherein it is mated onto the receiving element 1 of the quick connector. The locking element 10 is provided with a matable element 11 that can be mated onto the receiving element 1 and has a bearing wall 12, which in the mated-on arrangement of FIG. 1 bears against the front side of the receiving element 1, taken in the direction of insertion. The locking element 10 is further configured with a front wall 13 that is spaced apart from the bearing wall 12 oppositely to the direction of insertion. Both bearing wall 12 and front wall 13 have a central clearance through which insertable element 3 can be passed, such that guide rails 14 are formed edgewise between bearing wall 12 and front wall 13. The locking element 10 further comprises an actuating element 15, which in the mated-on arrangement of the locking element 10 can be displaced, guided in the guide rails 14, relative to the matable element 11 perpendicularly to the direction of insertion of insertable element 3 into receiving element 1, as will be explained in more detail below.

Figure 2:
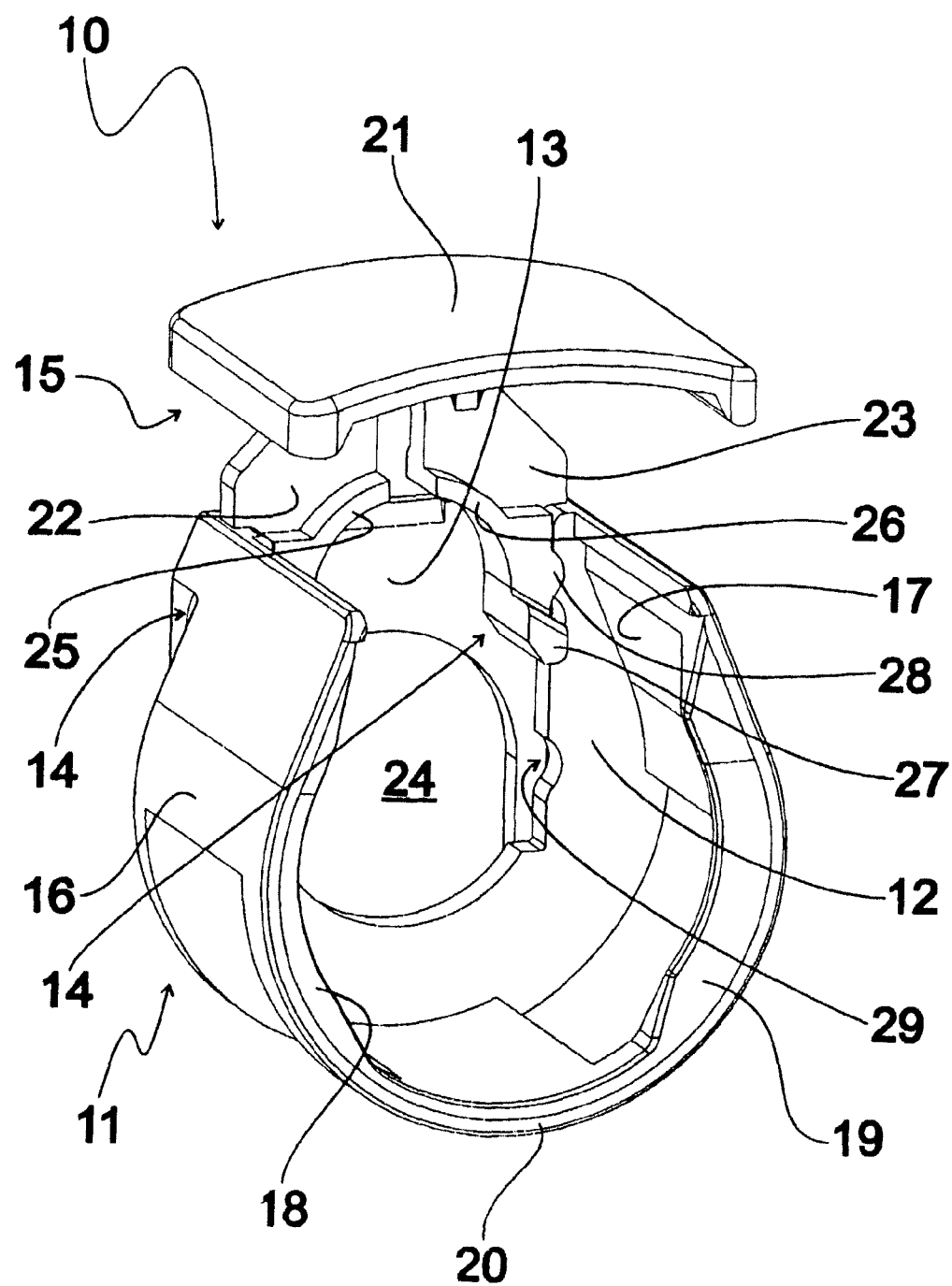
FIG. 2 is a perspective view of the exemplary embodiment according to FIG. 1.

FIG. 2 is a perspective diagram of the inventive locking element 10 depicted in FIG. 1 in the arrangement wherein it is mated onto the receiving element 1, looking toward the side of the bearing wall 12 facing away from front wall 13. It can be seen from FIG. 2 that the locking element 10 has a first side wall 16 and a second side wall 17, which are affixed to the side of bearing wall 12 facing away from front wall 13. Configured as snap connection means at the ends of side walls 16, 17 facing away from bearing wall 12 are radially inwardly directed projections 18, 19, which, in an arrangement wherein the locking element 10 is mated onto a receiving element 1, engage behind the side of the receiving element 1 disposed rearwardly in the direction of insertion of insertable element 3 into receiving element 1, and thereby, in combination with bearing wall 12 belonging to matable element 11 and disposed forwardly in the direction of insertion of insertable element 3 into receiving element 1, releasably lock matable element 11 on receiving element 1. To achieve the firmest possible connection to receiving element 1, side walls 16, 17 are connected to each other via a bridge portion 20 usefully formed onto the respective back ends of said side walls 16, 17.

It can further be appreciated from FIG. 2 that the actuating element 15 is provided with a slightly curved cover plate 21 that extends from the plane of bearing wall in the direction of side walls 16, 17, and with a first arm 22 and a second arm 23, which are mounted substantially at right angles to cover plate 21 and engage in the guide rails 14, such that the actuating element 15 is displaceable perpendicularly to matable element 11 between an extended, released position depicted in FIG. 2 and a retracted, locked position. Arms 22, 23 are each provided on their respective sides adjoining the clearance 24 with a reinforcing rib 25, 26 that extends in the circumferential direction and projects in the direction of side walls 16, 17, and on which in turn are configured endwise-disposed abutment noses 27 also projecting in the direction of side walls 16, 17.

Finally, it can be appreciated from the representation according to FIG. 2 that configured on the matable element 11 in the region of guide rails 14 and arms 22, 23 are snap connection means in the form of snap lugs 28 and snap indentations 29 that engage in one another both in the released position illustrated in FIG. 2 and in the locked position, and in both of these positions protect the actuating element 15 to a certain degree against forces operating in the displacement direction.

FIG. 3 is a partially cut-away perspective view of the exemplary embodiment according to FIG. 1, in an arrangement wherein it is mated onto a quick connector with the actuating element 15 in the retracted, locked position, and of the quick connector with an insertable element 3 properly inserted in receiving element 1. In this arrangement of receiving element 1 and insertable element 3, retaining ring 2 is held in place by an annular retaining spring 30, which surrounds insertable element 3 and which comprises radially inwardly extending retaining lugs 31 that engage behind the retaining ring 2. To release insertable element 3, retaining spring 30 must be deformed by the exertion of pressure on a release side 32 to such an extent that the engagement between retaining ring 2 and retaining lugs 31 is released and insertable element 3 can be removed from receiving element 1 against the direction of insertion.

Direct access to the release side 32 is prevented, however, in the locked position of actuating element 15, by the fact that release side 32 is covered by cover plate 21, thus protecting the quick connector against accidental disengagement of the connection between receiving element 1 and insertable element 3. Nevertheless, should the connection between receiving element 1 and insertable element 3 be accidentally released, for example by the exertion of pressure on the release side 32 due to the accidental insertion of an elongated object, such as the blade of a screwdriver, between cover plate 21 and release side 32, or due to wear on the retaining ring 2 or the retaining lugs 31, the arms 22, 23 with their reinforcing ribs 25, 26, which are disposed relatively closely adjacent a shaft segment 33 of insertable element 3, form an additional abutment that holds insertable element 3 in receiving element 1 when actuating element 15 is in the locked position.

It can further be appreciated from FIG. 3 that the abutment noses 27 extend into the receiving space 7 and thereby prevent actuating element 15 from being removed completely from the guide rails 14. In this way, the movable actuating element 15 is also held captive in the mated-on arrangement of locking element 10.

It is understood from the foregoing description that the specific shape of the matable element 11 and of the actuating element 15 is adapted to the particular conformation of the receiving element 1 of the quick connector.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A locking element for a quick connector for coupling a receiving element and an insertable element, the receiving element having a front side and the insertable element having a retaining ring and insertable into the receiving element along an insertion direction, said locking element comprising:
   a matable element including a bearing wall, a pair of side walls, and a pair of inwardly directed projections disposed on free ends of said side walls and spaced from said bearing wall along the insertion direction, said bearing wall abutting the front side of the receiving element and said inwardly directed projections releasably engaging behind the front side of the receiving element to releasably attach said matable element to the receiving element, said matable element also including a front wall disposed on a side of said bearing wall facing away from said inwardly directed projections, and a pair of guide rails disposed between said bearing wall and said front wall; and
   a separate actuating element mounted within said matable element for movement between a released position and a locked position, said actuating element including a locking device engageable with the retaining ring of the insertable element, said locking device including two laterally disposed arms displaceably mounted in said guide rails, and a cover plate connected to said arms.

2. The locking element of claim 1, further comprising snap engagement structures on said actuating element and on said matable element, respectively, that engage one another in said locked position.

3. The locking element of claim 1, further comprising at least one abutment nose on said actuating element, said abutment nose extending into a receiving space in said receiving element when said locking element is mated onto said receiving element.

* * * * *